United States Patent

[11] 3,627,925

[72] Inventor David C. Roberts
Rochester, Minn.
[21] Appl. No. 889,410
[22] Filed Dec. 31, 1969
[45] Patented Dec. 14, 1971
[73] Assignee International Business Machines Corporation
Armonk, N.Y.

[54] BEAM VELOCITY CORRECTION FOR FLYING SPOT OPTICAL SCANNERS

15 Claims, 7 Drawing Figs.

[52] U.S. Cl. .......... 178/7.7, 315/24
[51] Int. Cl. .......... H04n 3/22
[50] Field of Search .......... 178/6.8, 7.7, 6, DIG. 1; 315/18, 19, 24

[56] References Cited

UNITED STATES PATENTS

| | | | |
|---|---|---|---|
| 3,101,415 | 8/1963 | Libenschek | 178/DIG. 1 |
| 3,189,873 | 6/1965 | Rabinow | 340/146.3 |
| 3,389,294 | 6/1968 | Shaw | 315/19 |
| 3,492,424 | 1/1970 | Hare et al. | 178/69.5 TV |

OTHER REFERENCES

IBM Technical Disclosure Bulletin, Vol. 10, No. 5, Oct. 1967, pp. 612- 616, copy in 315- 18

*Primary Examiner*—Robert L. Griffin
*Assistant Examiner*—Richard K. Eckert, Jr.
*Attorneys*—Hanifin and Jancin and J. Michael Anglin

ABSTRACT: A document having accurately preprinted marks is scanned with a timed raster. For vertical speed correction, the time between two series of parallel marks is compared with a standard number. On a display CRT, a short line is intensified for each scan having a duration less than the standard number; a long line is intensified for each duration longer than the standard number; and an intermediate line is intensified when the duration equals the standard number. Beam velocity is adjusted to bring the greatest number of lines to the intermediate length. For horizontal speed correction, the number of scans between two vertical marks is measured. The first vertical mark is delayed in a shift register for a standard number of scans and is then displayed on the CRT. The second vertical mark is displayed on the CRT at the time of its occurrence. The beam velocity is then adjusted to line up the two mark images.

INVENTOR
BY DAVID C. ROBERTS
ATTORNEY

BEAM VELOCITY CORRECTION FOR FLYING SPOT OPTICAL SCANNERS

BACKGROUND OF THE INVENTION

The present invention relates to flying spot optical scanners, and particularly concerns the beam speed adjustment and correction of such scanners. Optical scanners for use in many fields of technology employ a raster scan for acquiring or displaying information. A raster scan is generated by causing a spot of light to be projected in a series of spaced line segments. The flying spot may be produced on the face of a cathode-ray tube (CRT) or deflected from a point source by mechanical or electro-optical means, for instance.

In many applications of optical scanning, and particularly in character recognition systems, it is important that the raster size have a known, constant value. Conventional components employed in such scanners, however, are notorious for their long-term drift propensities. Conventional magnetic deflection CRT scanners driven by integrators, for instance, require beam speed adjustments almost on a daily basis.

A conventional approach for beam speed adjustment employs an online statistical computer program in connection with an accurately preprinted test document. This procedure is undesirable in several respects. First, the adjustment is a lengthy, cumbersome process requiring the running of the program, interpreting a set of printed results, adjusting the beam speed, and rerunning the program to verify the adjustment. Second, the scanner must be actually connected to a central processing unit (CPU), and ties up a considerable amount of machine time during the test. A third and perhaps the most important disadvantage is that the conventional program must collect high-resolution video patterns from the scanner at a data rate many times higher than that used in the normal scanning modes; this renders the scanner incompatible for use with many of the smaller, and otherwise acceptable, CPU's.

SUMMARY OF THE INVENTION

The present invention overcomes these and other disadvantages, and advances the state of the scanning arts, by providing a method of and apparatus for off-line beam speed correction. The invention also provides an easily understood display and adjustment of beam speed, allowing untrained personnel to perform this procedure. Moreover, the apparatus of the invention is made simple and inexpensive, especially by its use in a dual role in many components already found in conventional character recognition machines and other scanners.

Broadly speaking, the invention is practiced by scanning an accurately preprinted document with a spaced raster pattern divided into a plurality of units or increments. The increments may be either complete scans (i.e., strokes or line segments) of the scan or timed increments of each individual scan or stroke. Certain marks printed on the document are then detected and the number of increments occuring between at least one pair of the marks is measured and compared with a standard number. The result of this comparison is next displayed by controlling the position of indicia or lines on the face of a display tube. The positioning of the indicia may be accomplished either by locating entire lines at different points on the display tube, or by controlling the location of the end points of otherwise stationary lines. One or more lines of either type may be employed. Finally, a beam speed adjustment is made to bring the displayed indicia into a predetermined relationship. In one embodiment, a proper adjustment causes two of the indicia to line up with each other; in another embodiment, the adjustment causes most or all of the variable-length lines to assume a predetermined standard length.

Other features, advantages and objects of the present invention, as well as modifications obvious to those skilled in the applicable arts, will become apparent from the following detailed description of preferred embodiments thereof, taken in conjunction with the accompanying drawing.

DETAILED DESCRIPTION OF THE SYSTEM

Figure 1:
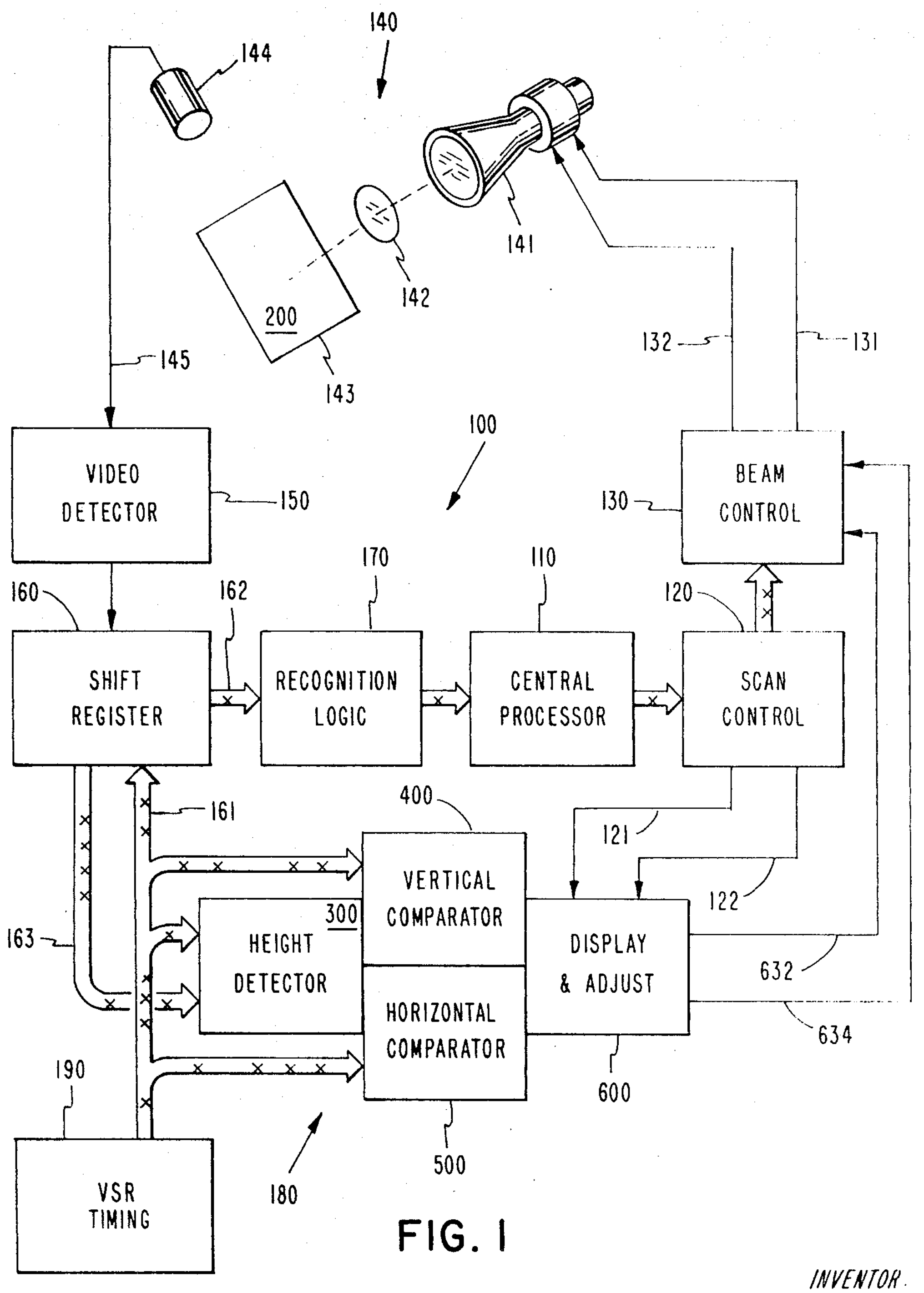
FIG. 1 shows a block diagram of the invention in the exemplary environment of a character recognition system employing a flying spot scanner.
Figure 7:
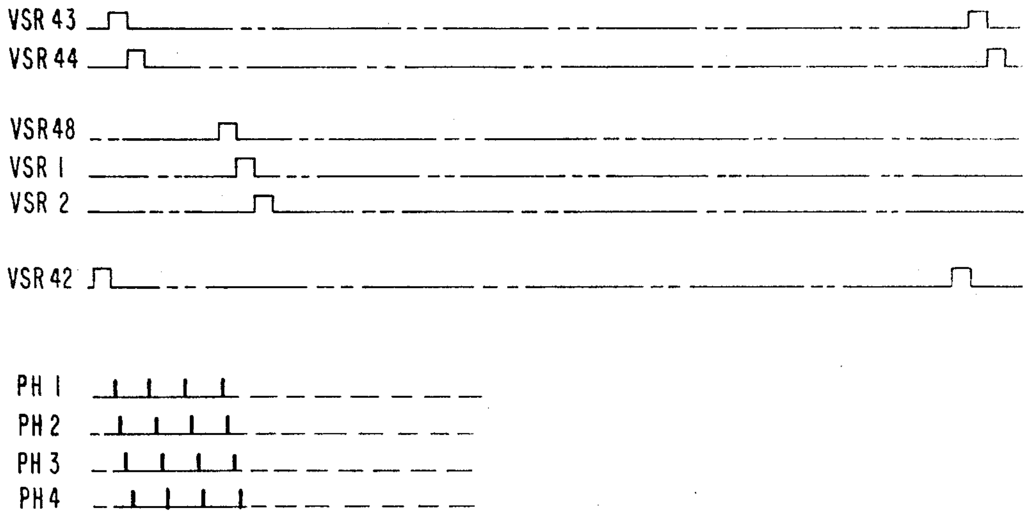
FIG. 7 is a timing diagram showing various time intervals.

Although the present invention is useful with many different types of optical scanners, it is particularly advantageous in connection with a recognition system 100 of the general type shown in FIG. 1. In its normal mode of operation, CPU 110 of system 100 initiates a recognition cycle by commanding scan control unit 120 to perform a series of raster or other scanning patterns. Beam control unit 130 then executes the desired pattern by providing horizontal and vertical drive signals on lines 131 and 132 to a magnetically deflected CRT 141 of scanner 140. The generated light spot is then passed through optical system 142, reflected from a document 143 and sensed by photomultiplier tube 144. The analog video stream on line 145 is then detected and digitized by video detector 150. A shift register 160 accepts the digitized video to provide an electronic image of the pattern scanned on document 143. Timing unit 190 provides a series of conventional timing (VSR) signals on lines 161 for the use of other units in the system. These signals are shown in detail in FIG. 7. Various forms of the electronic image are transmitted from register 160 over lines 162 and 163. Line 162 provides an input to recognition unit 170, which completes the recognition cycle by identifying the image to CPU 110.

Figures 2, 4, 5:
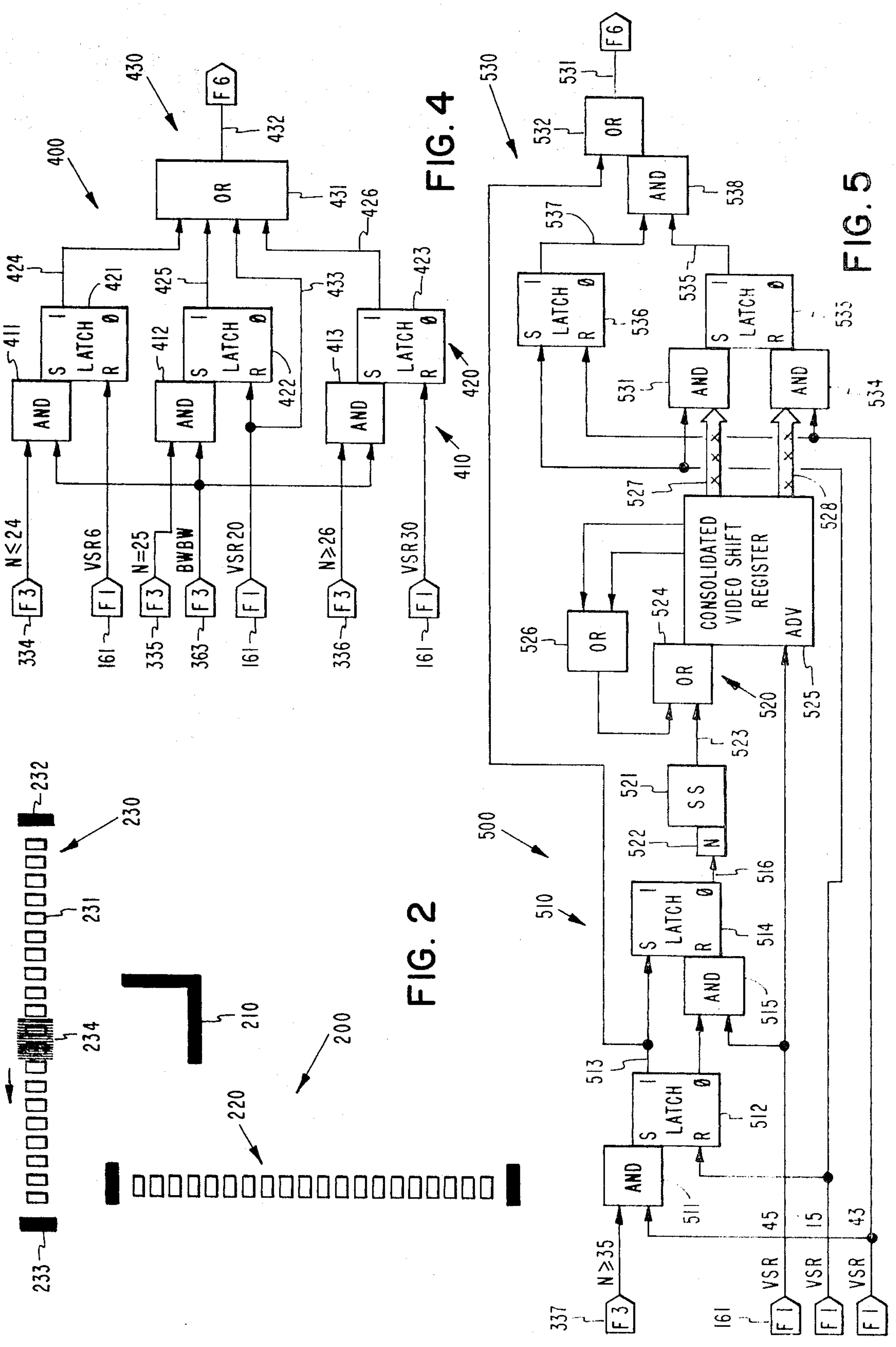
FIG. 2 shows a portion of a preprinted document useful in connection with the invention.
FIG. 4 is a schematic of the vertical comparator of FIG. 1.
FIG. 5 shows the horizontal comparator of FIG. 1.

The operation of the speed adjustment apparatus 180 takes place in a diagnostic mode of system 100. As may be seen from FIG. 1, CPU 110 (as well as recognition unit 170) is superfluous during the operation of the diagnostic mode, and may be used for other purposes. Beam speed correction first requires the replacement of document 143 by a special test document 200, a portion of which is shown in FIG. 2. Document 200 contains an L-shaped mark 210 used merely for locating scanning fields on the document, as in conventional practice. Beam speed analysis uses an accurately preprinted pattern such as 220 or 230. Documents having the required accuracy may be easily made and reproduced. Pattern 230, used in the description to follow, contains a horizontal line of machine-printed OCR A-Font zeros 231 bounded by a pair of long vertical marks (LVM) 232 and 233; such marks are conventionally used as field dividers in character recognition applications.

When scan control 120 is switched to the diagnostic mode, it commands beam control 130 to perform a raster scan routine repeatedly over the pattern 230, as is done in using the conventional statistical computer program. A portion of this raster is illustrated as the series of closely spaced lines 234, FIG. 2. The scanning pattern progresses from right to left, as indicated by the arrow. Adjustment apparatus 180 then accepts vertical and horizontal signals 121 and 122, corresponding to the signals 131 and 132, for providing a corresponding raster pattern within display and adjust unit 600. Meanwhile, height detector 300 accepts video signals 163 and timing signals 161 for two purposes. The first of these purposes is to identify the marks 232 and 233 for use by horizontal comparator 500. The second purpose is to measure the distance, in terms of numbers of scan increments, between the tops and bottoms of zeros 231 for use by vertical comparator 400. Display and adjust unit 600 then accepts the signals from comparators 400 and 500 in order to intensify predetermined portions of the aforementioned raster pattern as visible indicia. Adjustments are then made to bring the intensified line portions into a specified relationship.

THE VIDEO HEIGHT DETECTOR (FIG. 3)

The purpose of video height detector 300 is to accept video and timing information on lines 163 and 161 and to produce therefrom signals relating to the extent of detected video and valid combinations of black-white video transitions for use in units 400 and 500. The timing and video signals on lines 161 and 163 are of a conventional type. The conventional shift register 160 is a linear chain of cells through which the digitized video stream is shifted under the control of a vertical scan ring (VSR), 190. The cells of register 160 are conceptually divided into groups of 48, each group corresponding to one scan of the raster pattern, and each cell within a group corresponding to a portion or subinterval of each scan line. The term "increment" may be used to denote a portion of the scan pattern defined by one or more cells of register 160, or, alternatively, by one or more timing signals from VSR 190. The labeled signals on line 163 may be taken from any scan, since the video data is shifted through the entire register. Additionally, the designations on line 163, FIG. 3, contain either a "B", indicating that the cell must contain black (i.e., mark) video for the corresponding line to be up, or a "W", indicating that the cell must contain white (i.e., background) video for the corresponding line to be up. The VSR numbers on line 161 indicate timing signals corresponding to the similarly numbered VR cells. VSR1–VSR42 times occur during the actual scan; VSR43–VSR48 are used for scanner retrace. In addition, each VSR time contains four-phase clock signals PH1–PH4.

The operation of unit 300 begins during retrace time before each scan of the raster by resetting all latches via the VSR48 signal on line 161. Then, as the digitized video stream is shifted through the VR cells of the register 160, a black detector 310 senses the presence of two contiguous black detector 310 senses the presence of two contiguous black bits in cells VR42 and VR43 via AND-gate 311 and OR-gate 312 at PH2 time. At this point in the scan, AND 311 is enabled, and AND 312 is disabled, because of the reset state of latch 343. The PH2 clock signal synchronizes black detector 310. The requirement for two contiguous black bits minimizes the response of detector 310 to noise pulses.

The output of OR 312 then energizes a black transition detector 320. A positive transition on AC-coupled input 321 of AND 322 sets latch 323, in the absence of the set state of latch 343 appearing on inverting input 324 of AND 322. That is, since latch 343 is initially reset during each scan, latch 323 can be set only during the first black video of the scan. The setting of latch 323 then activates counting unit 330 by providing an input to the "advance" input of counter 331 through AND 332. AND 332 is synchronized by PH3, which, it will be remembered, occurs once during each VSR time.

In addition to the reset provided by VSR48, the initially reset state of latch 323 had disabled AND 341, through inverting input 342, from setting latch 343. However, when latch 323 has been set by the first black video in the current scan, AND 341 is enabled to pass a positive transition on AC-coupled input 344 to set latch 343 of the white transition detector 340. The signal for input 344 is obtained from a white detector 350, which detects six contiguous white bits in register cells VR38–VR43. AND 351 is also gated by PH2 to provide synchronization.

The setting of latch 343 has no immediate effect upon counting unit 330. It does, however, disable inverting input 324 of AND 322 and enable inverting input 325 of AND 326. Therefore, the next series of two consecutive black bits in VR43 and VR44 enables AND 313 and OR 312 to pass a positive transition signal through AC-coupled input 327 of AND 326, and thence through OR 328 to reset latch 323. The resetting of latch 323 then disables AND 332 to prevent the clock signal PH3 from advancing counter 331. The resetting of latch 323 then enables inverting input 345 of latch 346 to pass a positive transition pulse through AC-coupled input 347 upon the sensing of the next series of six white bits by white detector 350. The output of AND 346 then passes through OR 348 to reset latch 343.

At VSR43 time (the end of the actual scanning stroke), the occurrence of a valid black-white-black-white (BWBW) sequence has placed both of the latches 323 and 343 in a reset state, thus enabling three of the four inputs of AND 361 in sequence detector 360. This combination of states, however, also occurs if no black video at all has been detected during the scan. Therefore, latch 362 is also set by the output of black detector 310, to indicate that at least one valid black series has been detected. The set state of latch 362 at VSR43 time enables AND 361 to provide an output on line 363 to indicate that a valid BWBW sequence has occurred during the current scan. This sequence output is utilized in vertical comparator 400, FIG. 4, as will be explained. Latch 362 is then reset during scanner retrace, at VSR48 time.

Returning to the counting unit 330, it will be noted that somewhat different transition sequences control the incrementing of counter 331. On the one hand, a valid black-white-black (BWB) transition causes counter 331 to be started and stopped during the scan so as to accumulate the number of VSR time increments required to scan the enclosed white area of zeros 231, FIG. 2. The number stored in counter 331 is interpreted by decoder 333 to provide an output on one of the lines 334–336, according to whether the stored number is less than 25, equal to 25 or greater than 25. On the other hand, the scanning of long vertical marks (LVM) 232 and 233, FIG. 2, will produce sufficient black video to set latch 323, but may not produce sufficient white video thereafter to set latch 343 and normally will not produce a second black video signal sufficient to reset latch 323. In this latter instance, counter 331 will be started during the first valid black sequence sensed by detector 310, but it will not be disabled until latch 323 is reset at VSR48 time during scanner retrace. Since the length of the LVM mark is equal to at least 35 VSR units, output 337 of decoder 332 will signal to horizontal comparator 500, FIG. 5, that the current scan stroke contains an LVM. In addition, the absence of the BWBW sequence during the scanning of the LVM will inhibit sequence detector 360 from providing an output on line 363. In this way, counting unit 330 may be used for both the vertical comparator 400 and the horizontal comparator 500, without confusion as to which type of mark is being scanned. Counter 331 is reset at VSR 3 time during the succeeding scan, in order to enable it to contain a different count during each scan.

To summarize the operation of video height detector 300, each scan stroke begins with a reset condition in latches 323, 343 and 362. The first two consecutive black bits in VR42 and VR43 sets latch 323 and activates counter 331 to advance once count during PH3 of each VSR time. Then, even if no further video transitions are observed during the scan stroke, output 337 will indicate the presence of an LVM. But, if six consecutive white bits are observed after latch 323 has been set, latch 343 is also set. Thereafter, the next black video in VR43 and VR44 allows latch 323 to be reset. (Note that black detector 310 operates on VR42 and VR43 when latch 343 is reset, and operates on VR43 and VR44 when latch 343 is set; this avoids the elision of one VSR count which would otherwise occur, due to the synchronization of the unit 300.) The resetting of latch 323 disables counter 331. Then, the next series of consecutive white video in white detector 350 resets latch 343. Latches 323 and 343 are now in the same states with which they started the scan stroke except that latch 362 is in a set state because of the detection of at least one valid series of black bits during the stroke. Thus, output line 363 of sequence detector 360 indicates that a valid BWBW sequence has occurred. During scanner retrace, VSR 48 resets all three latches 323, 343 and 362. Thus, the detection of an invalid sequence during the scan stroke will not affect the operation of height detector 300 during subsequent scan strokes.

THE VERTICAL COMPARATOR (FIGURE 4)

Vertical comparator 400, in conjunction with sequence detector 360 and counting unit 330, determines the number of VSR units or increments in each scan which occur within the enclosed white area of the zeros 231, FIG. 2. This number is then compared with a standard number which represents the correct amount of VSR units which should occur within this white area if the vertical speed of the scanner is correct. The output of vertical comparator 400 is a signal whose duration represents the results of this comparison.

The operation of unit 400 begins when the detection of valid BWBW sequence on line 363 enables gating unit 410 to pass the applicable decoder output 334–336 into timing unit 420. It is to be noted that signal 363 performs two functions within unit 400. In the first place, its presence signifies that a valid zero 231 has been scanned, and thus that a vertical speed measurement is to take place. Secondly, signal 363 is gated within AND 361 so as to occur only at the end of each scan, at VSR43 time; this latter fact synchronizes the beginning points of the output pulses of unit 400. Then, if counting unit 330 has accumulated a count during the current scan stroke of 24 or less, AND 411 will set latch 421 at VSR43 time. If signal 335 indicates that counting unit 330 has accumulated exactly 25 increments of the scan, AND 412 will set latch 422 at VSR 43 time; if 26 or more units have been accumulated, line 336 will condition AND 413 to set latch 423 at VSR43 time. In the construction of the actual system here described, the VSR increments for scanner retrace belong to the subsequent scan stroke; that is, each scan stroke begins with VSR43 of the previous scan, continues through VSR48, goes immediately to VSR 1 and ends at VSR42. Therefore, the applicable latch of timing unit 420 is actually set during the scan stroke immediately following the stroke during which the measurements were made.

Each latch of timing unit 420 performs the function of a single-shot pulse generator slaved to the VSR timing ring. If, for example, the scanner beam velocity is too high, line 334 will indicate that the enclosed white area has fewer than 25 VSR increments therein. Latch 421 will thereupon be set at VSR 43 time and reset at the following VSR6 time, thus producing a pulse on line 422 which is 11 increments in duration. If the beam speed is correct, latch 422 will be set by signals 335 and 363 at VSR43 time, and will be reset at the following VSR20 time. Output line 425 will therefore produce a pulse which is 25 increments in duration. If the scanning speed is too low, latch 423 will be set at VSR43 and will not be reset until the following VSR30 time, so that line 426 will carry a pulse having a duration of 35 VSR units.

Figure 6:
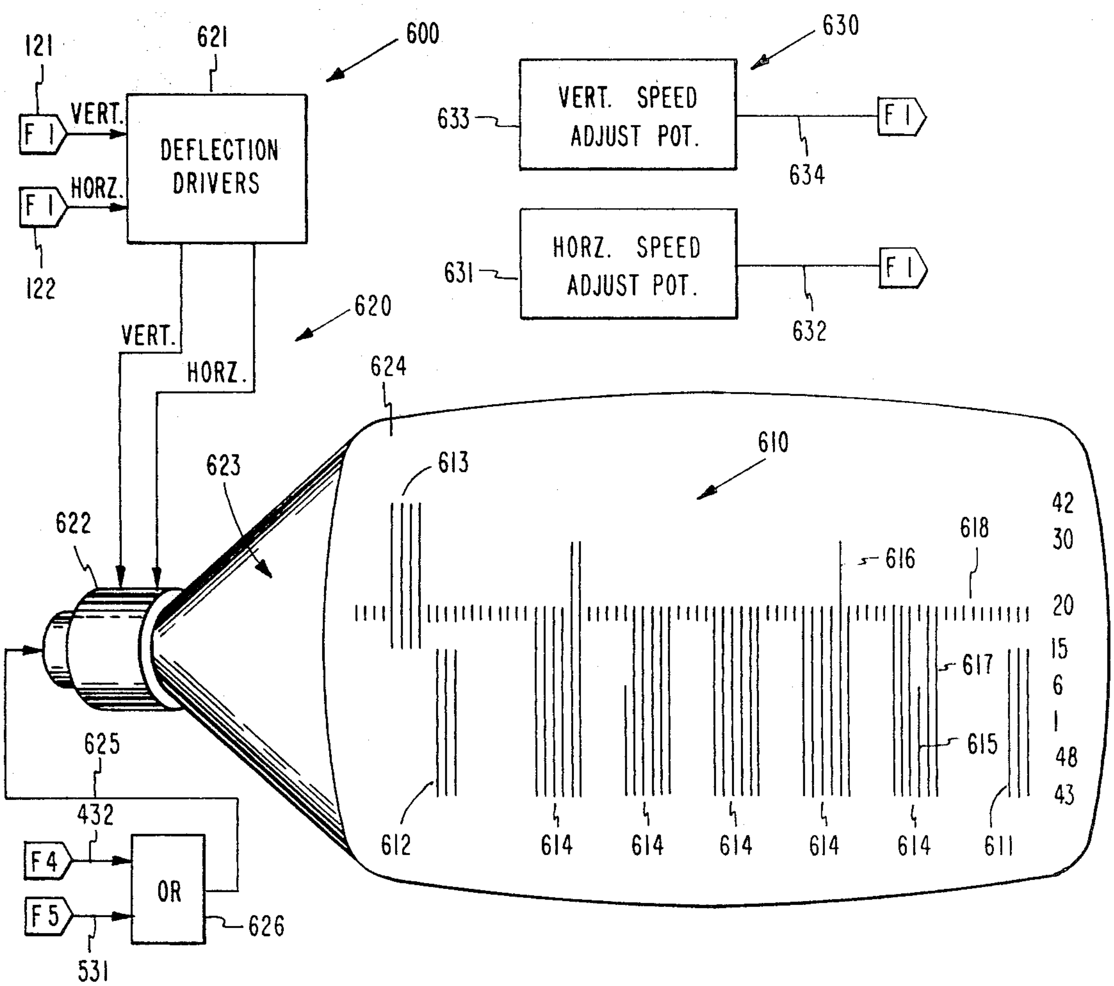
FIG. 6 depicts the display and adjustment unit shown in FIG. 1.

An OR-gate 431 of gating means 430 then passes the single pulse on one of the lines 424–426 to output line 432. In addition, line 433 produces a short output pulse on line 432 during VSR20 time of each scan stroke. The purpose of this short pulse is to provide a reference indicating the time at which the end of a pulse should occur if the scanner speed is correct. The purpose of signal 432 is to create a display as will be explained in connection with FIG. 6, for adjusting the vertical speed of the scanning beam. Note that, because of the gating of unit 400 by transition signal 363, vertical speed pulses will appear on line 432 only during the scanning of zeros 231, FIG. 2. In the blank spaces between zeros 231, and during scanning of LVM's 232 and 233, only the short pulse at VSR 20 will be produced.

THE HORIZONTAL COMPARATOR (FIGURE 5)

The function of horizontal comparator 500 is to detect the scanning of long vertical marks 232 and 233, and to provide display signals indicative of a number of complete scan strokes which have occurred between these two marks. That is, in this instance, each individual scan is taken as one unit or increment of the complete raster pattern 234, FIG. 2. Briefly, comparator 400 senses the presence of marks 232 and 233 in an LVM detector 510, compares the number of scans between these marks with a standard number in comparison unit 520, and produces signals indicative of this comparison in signal generator 530.

Figure 3:
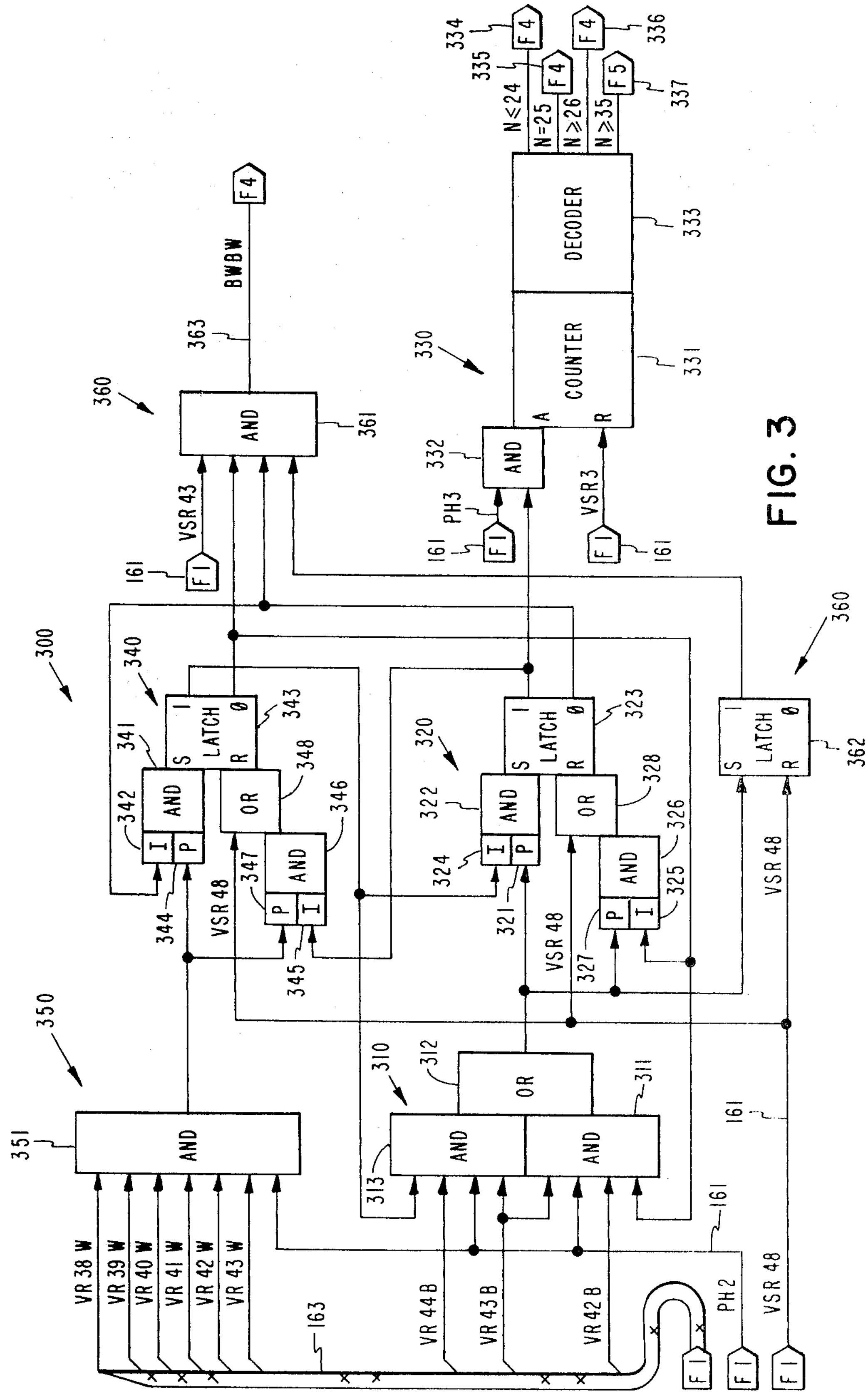
FIG. 3 is a schematic of the video height detector of FIG. 1.

As has been explained, the presence of an LVM during a scanning stroke is sensed by output 337 so decoder 332, FIG. 3. At the end of each scan during which an LVM was sensed, signals 337 and VSR43 coact through AND 511 to set latch 512. About halfway through the following scan, at VSR 15 time, latch 512 is reset. Thus, latch 512 passes through a set-reset cycle for each scan during which an LVM was sensed. Output 513 of latch 512 then produces a display signal on output line 531, through OR 532, for each such scan. Output 513 also operates to set latch 514 at the first VSR43 time after the first scan containing an LVM. This produces a negative transition on output line 516 indicative of the leading edge of an LVM. Latch 514, can be reset only by the conjunction of a reset state of latch 512 occurring at VSR45 time, because of AND 515. But, since latch 512 is reset at VSR43 time during each scan containing an LVM, VSR 45 will not be effective to reset latch 514 until the first scan stroke which does not contain an LVM. Accordingly, output 516 of latch 514 contains only one negative transition for each LVM, regardless of its width.

The negative transition on output 516 fires single-shot 521 through its AC-coupled input 522. This produces a pulse on line 523 only at a transition produced by the trailing edge of an LVM. Line 523 then transfers this pulse through OR 524 and enters it as a single data bit into shift register 525. Register 525 is also utilized during the normal operation of the recognition system; hence its designation as a "consolidated video shift register". The data bit is then advanced through the 140 stages of register 525 by an advance pulse applied at VSR 45 time during each scan. However, since the desired delay is greater than 140 scans, input 526 of OR 527 picks up the data bit at the 139th stage and reenters it into register 525 through OR 524 as a second data bit. Then, during the succeeding scan, input 527 picks up the original data bit at the 140th stage and enters it as another data bit through OR's 527 and 524. This procedure may be repeated as often as desired to obtain the required delay. That is, the next full pass of the two artificial bits through register 525 will produce three bits on a third pass, four bits on a fourth pass, and so forth. The number of scans which have occurred since the end of the first LVM 232 is then represented by both the number of data bits within register 525 and their position in the register stages. A desired combination of these bits and their locations is sensed on lines 527. This combination, plus a small interval, is sensed on output lines 528. The effect of the entire delay generator 520 is thus to compare the time of occurrence of LVM 232 with a standard number which represents the number of scans which should occur between marks 232 and 233 if the horizontal beam speed of the scanner is correct. Any other form of comparison means would serve as well; this form was chosen because much of the hardware necessary for its implementation is already present in the recognition system.

AND-gate 531 of signal generator 530 accepts output line 527 of register 525, and operates to set latch 532 at VSR15 time of that scan during which all of the lines 527 are satisfied. Latch 532 is subsequently reset at VSR43 time four scans later, at which time signals on all of the lines 528 satisfy AND 533. Accordingly, output 535 of latch 533 produces a continuous signal for about four scans after the activation of output line 527. The exact number of scans used for this purpose is immaterial. Meanwhile, latch 536 is cycled once per scan at VSR15 and VSR43 times. Accordingly, output 537 of latch 536 is active during approximately the top half of each scan. Signals 535 and 537 are then combined in AND 538 to produce a signal on line 531 for the top half of each of the approximately four scans during which latch 535 is set. Meanwhile, LVM detector 510 also senses the presence of the second LVM 233 to provide signal on line 513 for the lower half of each scan during which LVM 233 is sensed. As explained hereinabove, this signal is also transmitted to line 531 via OR 532.

THE DISPLAY AND ADJUST UNIT (FIGURE 6)

The function of the apparatus designated generally by 600 is to receive the aforementioned signals 432 and 531, and to produce therefrom a display 610, on a display apparatus 620, for indicating various beam speed corrections to be effected by adjustment means 630. Deflection drivers 621 accept vertical and horizontal beam motion commands from scan control 120, FIG. 1, over lines 121 and 122 for driving deflection yoke 622 of cathode-ray tube (CRT) 623 so as to produce a raster pattern which is a magnified version of the pattern produced in CRT 141, FIG. 1. Drivers 621 and CRT 623 may be of any conventional types. The raster pattern, however, is not visible on the face 624 of CRT 623 unless an intensification signal is present on line 625. The intensification signal is produced from either of the signals 432 or 531 by OR-gate 626.

Although the raster pattern in display CRT 623 is similar to that of scanner CRT 141, it will be noted at the outset that pattern 610 does not correspond directly to the video signal sensed by photomultiplier 144 or detected by video detector 150. Rather, display 610 contains a set of arbitrary indicia produced by intensification signal 625 from comparators 400 and 500. It will also be noted that display 610 simultaneously contains information for making two separate and distinct speed adjustments. Furthermore, because of the particular synchronization employed within the apparatus 180, the intensified indicia appear during the scan immediately following that during which they were produced.

During the repeated sweep of pattern 230, FIG. 2, signal 531 intensifies the group of lines 611 as hereinabove described. For convenience of reference, some of the VSR numbers have been printed to the right of display 610. As has been stated, each scan stroke begins with VSR43, continues through VSR48, passes immediately to VSR 1, and ends at VSR42. The lines 611 represent the first LVM 232. The number of the lines 611 is equal to the number of scans during which LVM 232 was sensed, although this is irrelevant to the present invention. The vertical position of these lines on CRT face 624 indicate that they represent the mark 232, rather than the marks 231 or 233. Lines 611 do not themselves participate in the horizontal beam speed indication. After being delayed in comparison unit 520, however, lines 611 reappear as lines 612 in display 610. The rightmost line of the group 612 then indicates the position at which the leading edge of LVM 233 should be observed if the horizontal scanner speed is correct. The actual position of LVM 233 is indicated by the group of lines 613. Because of the particular implementation used in signal generator 530, the lines in the group 613 will not vary in number according to the width of mark 233. As indicated, the position of lines 613 extends from VSR15 to VSR42. This indicates that these lines represent the second LVM, 233, rather than the marks 231 or 232. The horizontal beam speed of the scanner is correct when the rightmost line of the group 613 is horizontally aligned with the rightmost line of the group 612. A potentiometer 631, or any other conventional means, may be then employed to produce a signal on line 632 for varying the horizontal velocity of the scanning pattern produced by beam control 130, FIG. 1.

As has been explained, the vertical speed indicia may be presented simultaneously with the horizontal speed indicia since no possibility of confusion exists therebetween. Each group 614 of the vertical speed indicia is produced during the scanning of one of the A-font zeros 231, FIG. 2. Each line of each group 614 has its lower end at the same point (VSR43), regardless of the position of the actual mark 231. The position of the end of each indicia, however, represents the comparison of the actual number of VSR increments within a zero 231 with a standard number indicating that the vertical beam speed is correct. The ends of these lines, however, are preferably not positioned in direct proportion to the above comparison, Rather, a short line (VSR43–VSR6) such as line 615 is produced for any scan during which the actual number of VSR units was less than the correct number; an intermediate-length line (VSR43–VSR20) such as 617 is displayed for any scan containing exactly the correct number of VSR units; and a long line (VSR43–VSR30) such as 616 points out any scan containing more than the desired number of increments. As an aid in correcting gross speed errors, the short dashes 618 are always displayed during VSR20 time, as explained hereinabove. This system of exact comparisons and exaggeration of errors has been found to be preferable to the display of errors in proportion to their magnitude. As has been pointed out, the vertical beam speed varies even during one sweep of a raster pattern. Indeed, the unreliability of a vertical speed measurement during a single scan was the impetus for the use of the prior art statistical computer program. That is, a statistical analysis over a plurality of scan strokes as required in order to set the vertical beam speed at an acceptable average value. Therefore, the vertical speed potentiometer 633 is adjusted to produce an output on line 634 such that the greatest possible number of lines 615–617 have their upper ends positioned at the short marks 618.

In summary, the present invention operates in a scanning system 100 having scan-producing means 120, 130, 140, video data producing means 144, 150, and means 190 for defining predetermined increments within the scanning pattern. If the scanning pattern is a raster scan, each increment may be a portion of one scan line, a complete scan line, or perhaps some other predetermined part of the pattern.

The first-described embodiment of the invention employs means 300 to detect a pair of specified locations on the set of marks 230, namely, the points corresponding to the upper and lower edges of the A-font zeros 231. These locations are identified by a particular sequence of gating signals from transition means 320, 340. Vertical comparator 400 then generates a signal on line 432 whose duration indicates the relationship between a standard number (e.g., 25) of scan increments to the actual number of incremental portions of each scan line which occur between detection of the two locations. Display means 600 produces visible indicia 614 whose controlled feature is a length indicating whether the standard number is greater than, equal to or less than the actual number of increments. Adjusting means 633 may then be rapidly and easily set so that lines 614 assume a configuration such that as many as possible have the length of line 617.

The second described embodiment employs means 300 to detect the presence of long vertical marks 232, 233 as the pair of specified locations in the set 230. This embodiment considers each complete scan line to be an increment of the scan; predetermined portions, or subintervals, of each individual scan are still used, however, to identify LVM's 232, 233 by their height: i.e., by counting the subintervals during which black is detected, using transition means 320, 340. Horizontal comparator means 500 expresses the relationship of a standard number to the actual number of scan lines between the two marks by delaying a data bit representing the first mark by a predetermined standard number of increments in a shift register, while passing a representation of the second mark at substantially the same time as it is detected. Thus, the signal on line 531 shows the relative temporal occurrence of the delayed first mark 232 and the undelayed second mark 233. Display means 600 converts this signal into visible indicia 612, 613 whose pertinent feature is a relative location indicative of a speed error. Adjusting means 631 may then be set so as to impart a configuration wherein specified ones of the lines 612, 613 are aligned with each other.

The present invention is of course useful with systems 100 and documents 200 other than those specifically described. Different implementations of the units 300–600 within the scope of the invention will also suggest themselves to those skilled in the applicable arts, as will aternative configurations of the indicia for presentation as a visible display 610.

It has been found that both the vertical speed adjustment 633 and the horizontal speed adjustment 631 may be made simply and quickly, even by untrained personnel. It has also been found that the adjustments in response to display 610 may be made quite accurately from the relatively sharp changes in the displayed pattern 610. Accordingly, besides the off-line and simplicity advantages accruing from the use of the display 610, the adjustments produced thereby are as accurate as those made by previous techniques.

I claim as my invention:

1. In a scanning system having means for producing a plurality of raster scans over a document containing a set of preprinted marks, timing means for defining a plurality of increments within each said scan, and means for producing video data from the scanning of said document, the combination comprising:

a video height detector responsive to said video data for detecting at least a pair of specified points on said marks, and for accumulating a representation of the number of said increments occurring between said points;

a comparator responsive to the relative magnitudes of said accumulated number representation and a representation of a standard number for generating a signal indicative of the difference between said representations;

displaying means responsive to said signal for producing at least one indicia having a length indicative of said difference; and correction means for adjusting a parameter of said scan-producing means so as to impart a predetermined reference length to said displayed indicia.

2. The system of claim 1, wherein said video height detector includes:

means responsive to said data for indicating a predetermined amount of contiguous black video indicative of the sensing of said marks;

means responsive to said data for indicating a predetermined amount of contiguous white video indicative of the sensing of a background area on said document;

transition means responsive to said indicating means for producing a first gating signal identifying said first point as that point on one of said scans at which said amount of black video first appears, and for producing a second gating signal identifying said second point as that point during said one scan when said amount of black video next appears after having been preceded by said amount of white video; and counting means for producing said accumulated representation, said counting means being enabled by said first gating signal and being disabled by said second gating signal.

3. The system of claim 2, wherein said comparator includes:

decoder means coupled to said counting means for producing first, second and third comparison signals when said accumulated number is respectively less than, equal to, and greater than said standard number; and means responsive to said first, second and third comparison signals for producing therefrom a pulse having respectively a first, second and third duration.

4. The system of claim 2, wherein said transition means further includes:

a sequence-detecting means for producing a third gating signal indicative of a video sequence comprising said amount of black video followed by said amount of white video followed by said amount of black video followed by said amount of white video; and said comparator further includes gating means for enabling the generation of said difference only in the presence of said third gating signal.

5. The system of claim 1, wherein said display means includes:

an indicator responsive to said scan-producing means for presenting a further plurality of raster scans; and means responsive to said signal for intensifying said further raster scans.

6. In a scanning system having means for producing a plurality of raster scans over a document containing a set of preprinted marks, timing means for defining a plurality of increments each corresponding to one of said scans, and means for producing video data from the scanning of said document, the combination comprising;

a video height detector responsive to said video data for detecting at least a specified pair of said set of marks and for producing respective first and second representations thereof;

a comparator responsive to the detection of said pair of marks for delaying said first representation by a standard number of said increments and for passing at least said second representation substantially undelayed;

displaying means coupled to said comparator for producing a pair of indicia having relative positions indicative of the number of said increments occurring between said delayed representation and said second representation; and correction means for adjusting a parameter of said scan-producing means so as to impart a predetermined relative location to said displayed indicia.

7. The system of claim 6, wherein said video height detector includes:

means responsive to said data for indicating a predetermined amount of contiguous black video indicative of the sensing of said marks;

transition means responsive to said indicating means for producing a first gating signal upon the appearance of said amount of black video during each one of said scans, and for producing a second gating signal upon the termination of said amount of black video during said one scan, said transition means being further adapted to produce said second gating signal at the end of said one scan;

counting means for accumulating a plurality of subintervals of said one scan, and for producing said first and second representations when the number of said accumulated subintervals exceeds a predetermined magnitude, said counting means being enabled by said first gating signal and being disabled by said second gating signal.

8. The system of claim 6, wherein said comparator includes a shift register containing a plurality of stages, one of said stages being adapted to accept a data bit indicative of said first representation and at least one other of said stages being adapted to produce said delayed representation, said data bit being advanced through said stages by said timing means.

9. The system of claim 8, wherein said comparator further includes:

means for sensing the presence of a data bit at any of a specified plurality of said shift register stages;

means for reentering said sensed data bit as a plurality of bits in a further of said stages; and means for producing said delayed representation upon the occurrence of a specified combination of said reentered bits in said stages.

10. The system of claim 8, wherein said comparator further includes:

means responsive to either of said first and second representations for producing a first pulse during a first fixed portion of one of said scans; and means responsive to said delayed representation for producing a second pulse during a second fixed portion of one of said scans.

11. The system of claim 10, wherein said display means includes:

an indicator responsive to said scan-producing means for presenting a further plurality of raster scans; and means responsive to said first pulse for intensifying a first fixed portion of at least one of said further scans, and responsive to said second pulse for intensifying a second fixed portion of at least one of said scans.

12. In a scanning system having means for producing a scanning pattern over a document containing a set of preprinted marks, means for defining a plurality of increments within said scanning pattern, and means for producing video data representative of said marks, the combination comprising:

means responsive to said video data for detecting at least a pair of specified locations on said set of marks;

comparator means responsive to said detecting means for generating at least one signal indicative of the relationship of a standard number of said increments to an actual number of said increments occurring between the detection of said pair of locations; and means responsive to said signal for displaying visible indicia, said indicia having a visible feature controlled by said signal.

13. The system of claim 12, further comprising means for adjusting a parameter of said scan-producing means so as to impart a predetermined configuration to said displayed indicia.

14. The system of claim 13, wherein said comparator means is adapted to compare the relative magnitudes of said standard number and said actual number, and to impart to said signal one of a plurality of time durations when said standard number is respectively less than, equal to and greater than said actual number.

15. The system of claim 13, wherein said comparator means is adapted to delay a representation of one of said locations by said standard number of increments, and to pass substantially undelayed a representation of the other of said locations, so as to impart to said signal a temporal sequence indicative of the relative magnitudes of said standard number and said actual number.

* * * * *